C. E. UMMACH.
FIXTURE FOR GAS OR ELECTRIC LIGHTING.
APPLICATION FILED JULY 12, 1909.
966,626.
Patented Aug. 9, 1910.
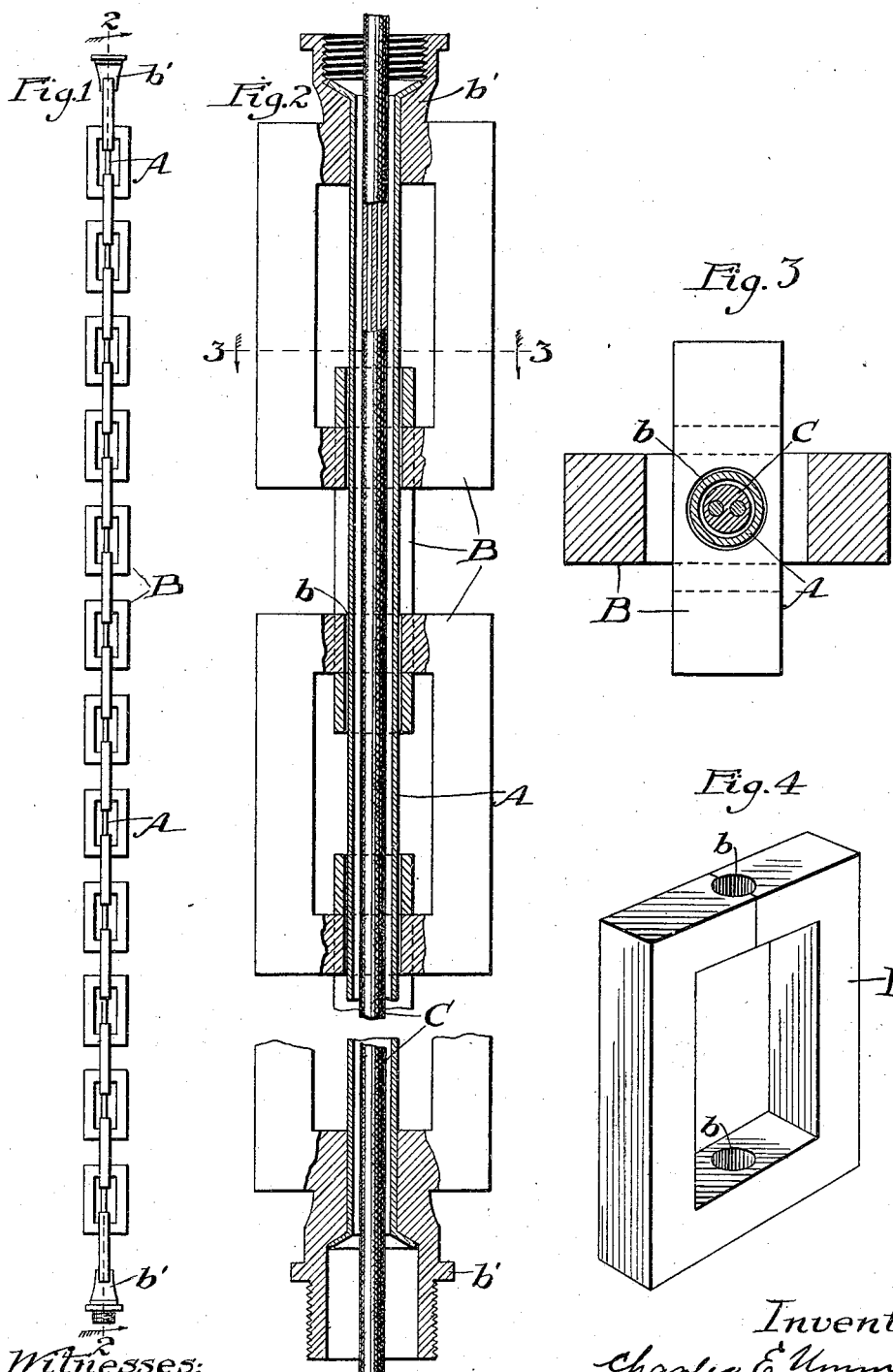

UNITED STATES PATENT OFFICE.

CHARLES E. UMMACH, OF CHICAGO, ILLINOIS.

FIXTURE FOR GAS OR ELECTRIC LIGHTING.

966,626.

Specification of Letters Patent. Patented Aug. 9, 1910.

Application filed July 12, 1909. Serial No. 507,216.

*To all whom it may concern:*

Be it known that I, CHARLES E. UMMACH, a citizen of the United States, residing at Chicago, in the county of Cook and State of Illinois, have invented certain new and useful Improvements in Fixtures for Gas or Electric Lighting, of which the following is a specification.

One object of the present invention is to provide a chandelier, or other fixture, of such construction that it may be used for lighting purposes in connection with either gas or electricity. In the present state of both of these branches of the art of lighting, artistic effects in chandeliers and other fixtures are absolute requisites, from the standpoint of commercial success, and hence another object of the invention is to provide a fixture of such construction that the novel structural features which give it functional advantages over other fixtures heretofore used for similar purposes, also afford an opportunity for ornamentation. The popular preference being largely in favor of electric lighting, partly because of its possibilities for the production of artistic effects, another object of the invention is to provide a fixture having the appearance of an electric fixture, which may be used as either a gas fixture or an electric fixture without any alteration or modification whatever.

To these ends, the invention consists in the features of novelty that are hereinafter described with reference to the accompanying drawing which is made a part of this specification and in which:

Figure 1 is an elevation of a fixture embodying the invention in its preferred form and adapted, with but slight, if any modification, for use either with gas or electricity. Fig. 2 is an enlarged central section thereof on the line 2—2, Fig. 1, with an intermediate portion broken away. Fig. 3 is a transverse section thereof on the line 3—3, Fig. 2. Fig. 4 is a perspective view of one of the links of the supporting chain used in the construction of the fixture.

In all of the several figures of the drawing, A represents a tube which is preferably made of brass but which may be made of any other metal or of any other material that will give it a greater or less amount of lateral flexibility. The tube is comparatively small in diameter, a tube adapted to supply a gas burner of about ninety candle-power being shown one-half size in Fig. 2.

In order to protect the tube against injury and at the same time relieve it of all tensile strains due to the weight of the lamp or burner or other part of the chandelier or fixture, it is passed through perforations formed through the adjacent ends of a series of links B which are linked together to form a chain of common and well known construction. In order to facilitate the assembly of the links, at least every other one is open, or split at one end, so that the portions of the link upon opposite sides of the split may be spread apart far enough to permit the next link to be linked therewith and again closed to complete the chain. The links are preferably of rectangular form, and the inner or engaging surfaces of the ends of adjacent links are flat so that they have firm contact with each other, but these particular characteristics of the links are not material so long as they contact with each other with sufficient firmness for supporting purposes in those instances in which the chain supports the fixture in whole or in part.

The adjacent ends of adjacent links cross each other transversely and are provided with registering perforations *b* through which the tube passes loosely, the perforations at the open ends of the links being formed by oppositely located notches in the extremities resulting from the splits, to which the open characteristic of the links is due, the notches being of such size and depth that the free ends of the links will straddle the tube. The ends of the tube are secured gas-tight in perforations formed in fittings *b'* carried by and preferably formed integrally with the terminal links of the chain, by soldering or other suitable means. These fittings *b'* are fashioned to meet individual requirements. For example, Fig. 1 shows a drop fixture adapted to be used for either gas or electricity.

When used for gas the fitting at the upper end of the chain is fashioned for threaded engagement with a gas pipe, while the fitting at the lower end of the chain is fashioned to receive a gas burner of any suitable kind, the ends of the tube in this instance being secured gas tight to the fittings, as already described. The same flexible tube and chain having the same end fittings similarly arranged and connected may be used when the fixture is used, as hereinafter described, for electricity, or, if the fittings shown are not adapted to an electric lamp, specially constructed fittings may be substituted. In these instances the weight of the fixture may be supported in whole or in part by either the chain or the tube.

The degree of flexibility of this fixture, when used as an element in the construction of chandeliers or other fixtures may be regulated, within prescribed limits, by varying the tension of the chain during the process of securing the ends of the tube to the end fittings of the chain. For a drop fixture, such as is shown in Fig. 1, it is preferable to hold the chain taut and allow the tube more or less slack—or, at any rate, relieve it of tension—while its ends are being secured to the end fittings. By doing so, the entire weight of the burner or lamp and its accessories will be supported by the chain and the tube and the joints between its ends and the end links of the chain entirely relieved of strain. In this case the chain will hang vertically and the chain and tube will be practically straight. When it is desired to flex the chain and tube and at the same time have them follow a symmetrical curved line, as, for instance, when the tube and chain are used in the construction of the chandelier and it is desired to curve or bend them considerably, the chain is given more or less slack while the ends of the tube are being secured to the end fittings.

The shape of the links of which the chain is made up forms no part of the present invention, so far as ornamentation is concerned, although it is an object of the invention that while performing their mechanical functions they shall also afford an opportunity for the exercise of the artistic skill of the designer.

An advantage in the use of metal for making the tube is, that it may be finished to correspond or harmonize with the chain, and this is very desirable in an electric fixture.

No change or alteration in the construction and arrangement of the tube and chain is necessary in order to adapt them for use in an electric fixture, the conductor being simply passed through the tube from one end to the other. It may be added, however, that when used in an electric fixture it is not necessary that the ends of the tube be secured to the fittings gas tight. In either event it is simply necessary to pass the conductor through the tube and properly connect the lower ends of the supply and return branches of the circuit to the electric lamp to be used and to connect their upper ends to supply and return wires leading to a suitable source of electricity.

What I claim as new and desire to secure by Letters Patent is:

1. As a new article of manufacture, a fixture for gas or electric lighting, having a chain made up of a plurality of links linked together, some of said links being split at one end and the free extremities resulting from the splits being notched to form perforations, the closed ends of the links having perforations registering with the perforations of the adjacent ends of adjacent links.

2. As a new article of manufacture, a fixture for gas or electric lighting, said fixture having a tube and a chain made up of a plurality of links linked together so that the adjacent ends of adjacent links cross each other transversely and have supporting contact with each other, some of said links being split at one end and the free extremities resulting from the splits being notched to form perforations, the closed ends of the links having perforations registering with the perforations of the adjacent ends of adjacent links, all of said perforations being occupied by the tube.

3. As a new article of manufacture, a fixture for gas or electric lighting, said fixture having a flexible tube and a supporting chain made up of a plurality of links linked together, the adjacent ends of adjacent links having supporting contact with each other, some of said links being split at one end and the free extremities resulting from the splits being notched to form perforations, the closed ends of the links having perforations registering with the perforations of the adjacent ends of adjacent links, all of said perforations being occupied by the tube.

4. As a new article of manufacture, a fixture for gas or electric lighting, said fixture having a tube and a chain made up of a plurality of links linked together, the adjacent ends of adjacent links crossing each other transversely, some of said links being split at one end and the free extremities resulting from the splits being notched to form perforations, the closed ends of the links having perforations registering with the perforations of the adjacent ends of adjacent links, all of said perforations being occupied by the tube and the ends of the tube being secured gas tight in the perforations of the terminal links of the chain.

5. As a new article of manufacture, a fixture for gas or electric lighting, said fixture having a tube and a chain made up of a plurality of links linked together, the adjacent ends of adjacent links being provided with registering perforations occupied by the tube, and the terminal links of the chain being provided with fittings having sockets in which the ends of the tube are secured gas tight.

CHARLES E. UMMACH.

Witnesses:
A. ARENSON,
L. M. HOPKINS.